April 20, 1926. 1,581,961
O. A. KING
GASOLINE RESERVE AND CONTROL DEVICE FOR AUTOMOBILES
Filed Feb. 6, 1926
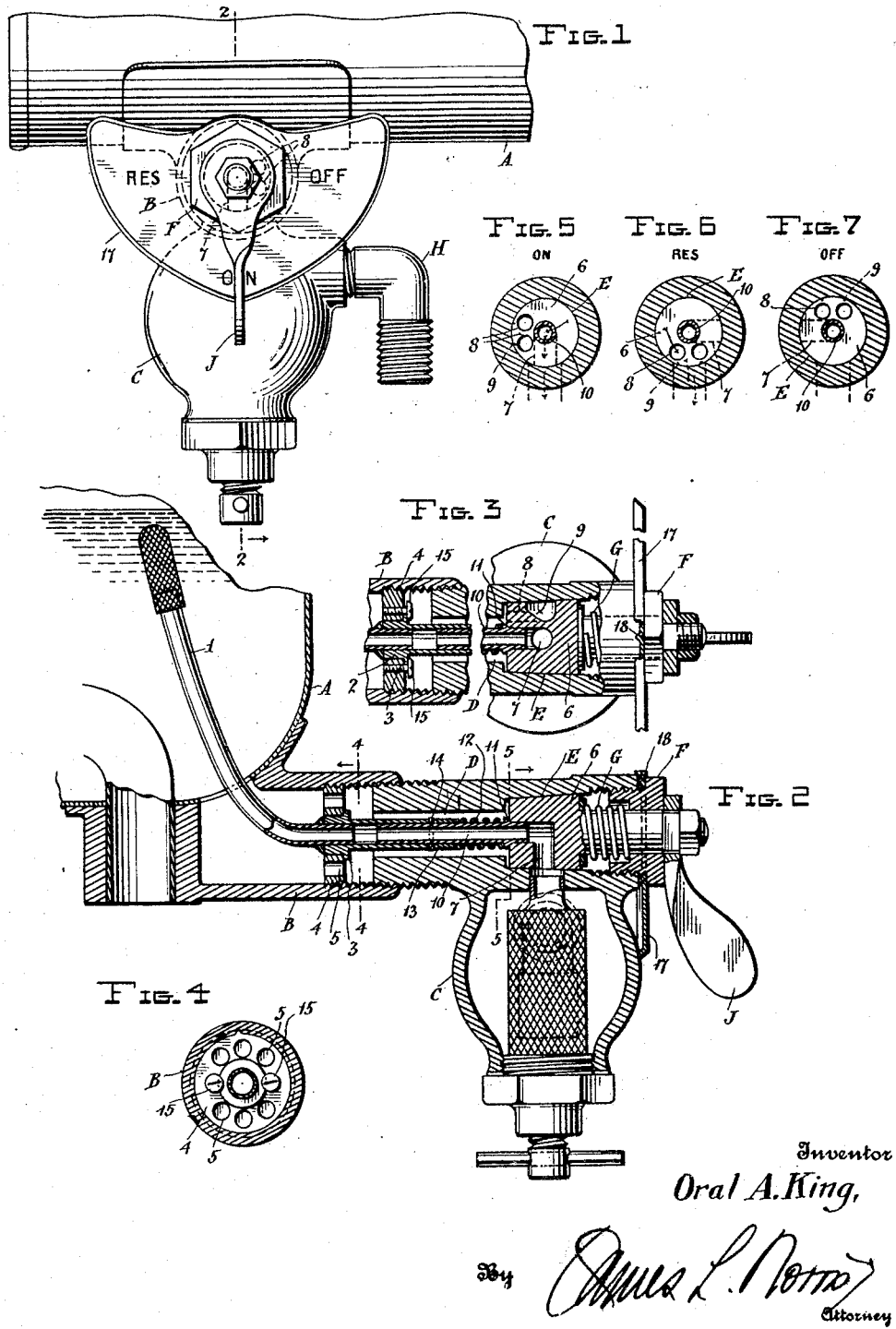
Inventor
Oral A. King, Patented Apr. 20, 1926.

1,581,961

UNITED STATES PATENT OFFICE.

ORAL A. KING, OF SOUTH NORFOLK, VIRGINIA.

GASOLINE RESERVE AND CONTROL DEVICE FOR AUTOMOBILES.

Application filed February 6, 1926. Serial No. 86,583.

*To all whom it may concern:*

Be it known that I, ORAL A. KING, a citizen of the United States, residing at South Norfolk, in the county of Norfolk and State of Virginia, have invented new and useful Improvements in Gasoline Reserve and Control Devices for Automobiles, of which the following is a specification.

This invention relates to gasoline reserve controls for auto-motive power plants and proposes the construction of a device particularly adapted for correlation with the specific fuel supply system now existing in a popular type of automobile for converting said system from one which supplies liquid fuel continuously to the engine until the fuel tank has been completely drained to one in which the gasoline supply is automatically interrupted when a predetermined low level in the tank has been reached, the opening of a valve being required before the remainder of the fuel is made accessible. The driver is thus put on notice by the stopping of his engine that the supply of gasoline is running low, whereupon he draws upon the reserve supply to proceed to a filling station.

One of the objects of the invention is to provide a reserve control device including a valve and conduit, the latter comprising an extensible portion connected with yielding pressure to said valve.

Another object of the invention is to provide a combined normal-supply control, reserve control, and cut-off valve for the fuel supply system.

A further object of the invention is the provision of a reserve supply control device which may be applied to the existing fuel supply system of an automobile with minimum modification or alteration of the parts.

Other objects of the invention will appear as the following description of an illustrative embodiment thereof proceeds.

In the drawings:—

Fig. 1 is a front elevation of certain fittings constituting part of the fuel supply system of a popular type of automobile, provided with the device of my invention.

Fig. 2 is a section taken along the line 2—2 of Fig. 1.

Fig. 3 is a section taken in a plane at a right angle to Fig. 2.

Fig. 4 is a section taken along the line 4—4 of Fig. 2.

Figs. 5, 6, and 7 are sectional views taken along the line 5—5 of Fig. 2 showing the valve in normal-supply, reserve, and off positions.

Referring now in detail to the several figures, the reference characters A, B and C represent, respectively, the gasoline tank, drainage elbow and sediment bulb fitting of a popular type of auto vehicle. The sediment bulb fitting has a transverse bore D enlarged and tapered at E to form a seat for a valve and is threaded at its outer end to receive a ring nut F, the latter forming a bearing for the stem of the valve and a keeper for a spring G which holds the valve to its seat. The sediment bulb is provided with a connection H leading to the carbureter, not shown.

All of the parts specifically referred to up to this point are well known, and standard equipment of the auto vehicle for which this invention in its specific form is designed, and are designated by letter in order the more readily to distinguish them from the new elements which, per se, and in combination with the old elements constitute the present invention.

A bent tube 1 is provided, having a cylindrical bearing portion 2 and a flange collar 3 adjacent said bearing portion. The pipe 1 is introduced through the elbow B into the tank A with its free end projecting upwardly and terminating at the level at which it is desired to trap the reserve quantity of gasoline. The pipe 1 is supported in the elbow B by means of a sleeve 4 mounted upon the cylindrical bearing portion 2 and screwed into the terminus of the existing thread of the elbow B. It is obvious that the sleeve 4 must be placed upon the pipe 1 before the latter is introduced into the elbow and it is clear that, since the pipe 1 cannot rotate within the elbow on account of its angular shape, the sleeve 4 must rotate upon said pipe to enable it to be threaded into the elbow in the manner described.

The sleeve 4 is provided with perforations 5, a diametrical pair of which may be engaged by a suitable wrench for screwing the sleeve into place.

The regular valve with which the sediment bulb fitting is normally equipped is discarded and the valve 6 substituted therefor, said valve being similar to the original valve in that it has a port 7 communicating with the sediment bulb C and through the latter with the carbureter connection, but in addition it has another port 9 represented by the aggregate areas of the passages 8 shown in Figures 5, 6 and 7, into which port the passages 8 merge, said port being angularly displaced with respect to the port 7 but in the same zone so that it, too, may be put into communication with the sediment bulb and carbureter alternatively with the port 7.

The port 7 opens centrally in the rearward face of the valve 6 and is connected with the pipe 1 by means of a telescopic section 10 of said pipe which has a valve face 11 pressed into resilient contact with the valve 6 by means of a spring 12 held in compression between a flanged portion of said extension adjacent its valve face and the stationary portion of said pipe, a sleeve 13 preferably intervening, the function of which is to compress a yielding washer 14 into fluid-tight relation with the telescopic joint of said pipe.

It is obvious that the threaded portion of the elbow B may be of different lengths on different elbows, also that the sediment bulb fitting may be screwed farther into said elbow in one instance than in another. It may happen also that due to very slight differences in dimensions the valve 6 may seat deeper in one fitting than into another. All of these possible circumstances necessitate the provision of a conduit of variable length between the flange 3 which bears against the sleeve 4 and the valve face 11 that engages the valve 6. The spring 12 serves not only to keep the valve face 11 pressed against the valve, but reacts also through the pipe 1, pressing the flange 3 against the sleeve 4, thus holding the pipe 1 securely in place. Additional means may be provided if desired for securing said pipe, consisting of the screws 15 which engage the sleeve 4, and the heads of which overlie the flange 3.

The valve is provided with a handle J and a plate 17 having suitable indicia with which the valve handle cooperates, indicating the normal "on," "reserve" and "cut-off" position of the valve. The plate 17 may be held against rotation by suitable means such as a slight projection 18 upset in the metal of the plate, which registers with a corresponding groove which may be filed or otherwise formed in the adjacent face of the sediment bulb fitting. The plate 17 is held in place beneath the ring nut F.

In operation the gasoline is normally supplied through the pipe 1, the outer end of which may be provided with a suitable strainer. The gasoline passes through the telescopic extension of said pipe and through the ports 7 into the sediment bulb and thence to the carbureter connection H, the normal open position of the valve being indicated in Figure 3. When the valve is turned to the position in which the reserve supply of gasoline is discharged, the flow takes place from the bottom of the tank A into the elbow B passing through the apertures 5 of the sleeve 4 which are sufficiently numerous to assure unrestricted flow, and then through the annular passage in the sediment bulb fitting outside of the pipe 1 and its extension, thence through the apertures 8 in the valve and through the port 9 to the sediment bulb.

In practice the construction may be somewhat simplified by omitting the sleeve 13 and washer 14, since the slight leakage which might occur through the telescopic joint of the pipe 1 will be insufficient to supply the fuel requirements of the engine and therefore will have no effect in preventing the stoppage of the engine through lack of fuel when the level of gasoline within the tank falls below the upper end of the pipe 1.

While I have herein described what I believe to be a practical and preferred embodiment of the invention, yet it is to be understood that such changes and alterations in the construction and arrangement of the several parts, as the exigencies of use may show to be necessary or desirable, may be made without transcending the scope of the invention as defined by the appended claims.

Having described my invention what I claim as new and desire to secure by Letters Patent, is:—

1. A gasoline reserve control device for insertion in a gasoline supply tank having a longitudinally extending discharge conduit provided with a carbureter connection, said device comprising a pipe of smaller external diameter than the diameter of said conduit and adapted to be arranged longitudinally within said conduit, said pipe having an extensible portion, a valve for insertion in said conduit and having ports for alternatively placing said pipe and said conduit into communication with said carbureter connection, and a spring normally pressing said extensible portion into valve-sealing contact with one of the ports of said valve.

2. A gasoline reserve control device for insertion in a gasoline supply tank having a longitudinally extending discharge conduit provided with a carbureter connection, said device comprising a pipe of smaller external diameter than the diameter of said conduit and adapted to be arranged longitudinally within said conduit, said pipe having a telescoping end portion, a valve for insertion in said conduit having ports for alternatively placing said pipe and said conduit into communication with said carbureter connection, and a spring normally pressing said telescopic end portion into valve-sealing contact with one of the ports of said valve.

3. A gasoline reserve control device for insertion in a gasoline supply tank having a longitudinally extending discharge conduit provided with a carbureter connection, said device comprising a pipe of smaller external diameter than the diameter of said conduit and adapted to be arranged longitudinally within said conduit, said pipe having a telescopic end portion, means for packing the joint between said pipe and telescopic portion, a valve for insertion in said conduit having ports for alternatively placing said pipe and said conduit into communication with said carbureter connection, and a spring normally pressing said telescopic end portion into valve-sealing contact with one of the ports of said valve, and simultaneously compressing said packing means.

4. A gasoline reserve control device for insertion in a gasoline supply tank having a longitudinally extending discharge conduit provided with a carbureter connection, said device comprising a pipe of smaller external diameter than the diameter of said conduit and adapted to be arranged longitudinally within said conduit of larger diameter than said pipe, a support for said pipe engagable with the interior wall of said conduit, said support being perforated to maintain fluid communication through said pipe, the latter having an extensible portion, a valve for insertion in said conduit having ports for alternately placing said pipe and said conduit into communication with said carbureter connection, and a spring normally pressing said extensible portion into valve-sealing contact with one of the ports in said valve and maintaining said pipe in place relative to said support.

5. A gasoline control device for a fuel supply system including a tank, an elbow connected with the bottom of said tank and having an interiorly threaded horizontal limb, and a sediment bulb fitting threaded partway into said elbow, said fitting having a conduit forming a continuation of the bore of the horizontal limb of said elbow and also having a carbureter connection communicating with said conduit through said sediment bulb, a pipe of smaller diameter than the conduit of said bulb and the internal diameter of said limb, said pipe extending through the horizontal limb of said elbow and having a part thereof bent up into said tank, a support for said pipe journalled thereupon and threaded into the horizontal limb of said elbow back of said sediment bulb fitting, said pipe having a flange bearing against said support and said support being apertured to permit the flow of fluid through said elbow, a valve in said fitting having ports alternatively placing said pipe and said conduit into communication with the carbureter connection, said pipe having an extensible portion communicating with one of the ports of said valve, and a spring surrounding said extensible portion normally pressing said portion into sealing contact with said valve and simultaneously maintaining said flange in place against said support.

In testimony whereof I have hereunto set my hand.

ORAL A. KING.